(12) United States Patent
Liu

(10) Patent No.: US 8,174,673 B2
(45) Date of Patent: May 8, 2012

(54) METHOD FOR WAFER ALIGNMENT

(75) Inventor: An-Hsiung Liu, Taoyuan (TW)

(73) Assignee: Nanya Technology Corp., Kueishan, Tao-Yuan Hsien (TW)

( * ) Notice: Subject to any disclaimer, the term of this patent is extended or adjusted under 35 U.S.C. 154(b) by 563 days.

(21) Appl. No.: 12/406,951

(22) Filed: Mar. 18, 2009

(65) Prior Publication Data

US 2010/0171942 A1 Jul. 8, 2010

(30) Foreign Application Priority Data

Jan. 5, 2009 (TW) ................................ 98100094 A

(51) Int. Cl.
*G03B 27/42* (2006.01)

(52) U.S. Cl. .......................................... 355/53; 355/77

(58) Field of Classification Search .................... 355/53, 355/77

See application file for complete search history.

(56) References Cited

U.S. PATENT DOCUMENTS

| 6,172,409 B1 * | 1/2001 | Zhou ............................. 257/620 |
| 2007/0190736 A1 * | 8/2007 | Liu et al. ....................... 438/386 |

* cited by examiner

*Primary Examiner* — Edward J Glick
*Assistant Examiner* — Mesfin T Asfaw
(74) *Attorney, Agent, or Firm* — Winston Hsu; Scott Margo

(57) ABSTRACT

A method for wafer alignment includes the following steps. First, a wafer including a first material layer and a second material layer on the top of the first material layer is provided, wherein the first material layer includes a first alignment mark. Then, the wafer is aligned in an exposure tool. After that, the second material layer is patterned to form a second alignment mark. Finally, an offset distance between the first alignment mark and the second alignment mark is measured in the exposure tool.

7 Claims, 5 Drawing Sheets

METHOD FOR WAFER ALIGNMENT

BACKGROUND OF THE INVENTION

1. Field of the Invention

The present invention relates to a method for wafer alignment, and more particularly, to a method for increasing alignment accuracy.

2. Description of the Prior Art

Lithographic technologies are key technologies that affect the critical dimensions in semiconductor processes. Most electric circuit patterns are formed by transferring the patterns of photo masks to photoresists in lithographic processes, and thereafter transferring the patterns of photoresists to the material layers of a wafer in etching processes. Thus, several marks are disposed on a wafer to increase alignment accuracy.

Sample wafers with alignment marks are put into product lines for testing alignment accuracy before wafers practically go into mass production. In the lithography process, the photo mask and the wafer are first aligned by an exposure tool using a set of pre-layer alignment marks typically located near an edge or on a scribe line of the wafer surface. Then, the exposure tool illuminates the alignment marks, and the reflected light signal produced by the alignment marks is read by the exposure tool to obtain precise alignment.

"Pre-layer" described in the instant application refers to a material layer processed in a previous lithography step, and "current-layer" described in the instant application refers to a material layer which is to be processed in the current lithography process. The alignment mark usually includes a set of trenches etched in a material layer on a wafer.

After exposure, wafers are developed. It is important to check if the electric circuit pattern in one material layer cooperates with the underlying electric circuit pattern; otherwise, the formed electric circuit may fail. Therefore, accuracy of the alignment is checked in an overlay tool by taking overlay marks on wafers as an overlay reference. Then, offset distances between the pre-layer overlay mark and the current-layer overlay mark can be measured by the overlay tool, and the exposure parameters and development parameters can be adjusted. Generally, the overlay mark is a set of trenches etched in a current material layer, or a set of protrusions on the previous material layer.

Since the above-mentioned alignment mark and overlay mark are respectively measured by different tools, i.e. the exposure tool and the overlay tool, the wafer stages and the detectors in each tool all have their own deviations. In other words, the measured results obtained from a single tool become more complicated due to the addition of the respective deviations and the total deviations become adversely enhanced.

SUMMARY OF THE INVENTION

Therefore, it is one objective of the present invention to provide a method which can increase the wafer alignment accuracy.

According to a preferred embodiment of the present invention, a method for wafer alignment comprises: providing a wafer having a first material layer and a second material layer on the top of the first material layer, the first material layer including thereon a first alignment mark; patterning the second material layer to form a second alignment mark in an exposure tool by taking the first alignment mark as an alignment reference; and measuring an offset distance between the first alignment mark and the second alignment mark in the exposure tool.

The feature of the present invention lies in using the alignment mark to measure the offset distance between the previous layer and the current layer. Furthermore, the measurement is performed only by the exposure tool. In other words, the overlay tool is replaced by the exposure tool in the present invention. Therefore, addition of deviations from the exposure tool and overlay tool can be avoided. Moreover, since the function of the overlay mark is replaced by the alignment mark, the overlay mark is no longer needed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
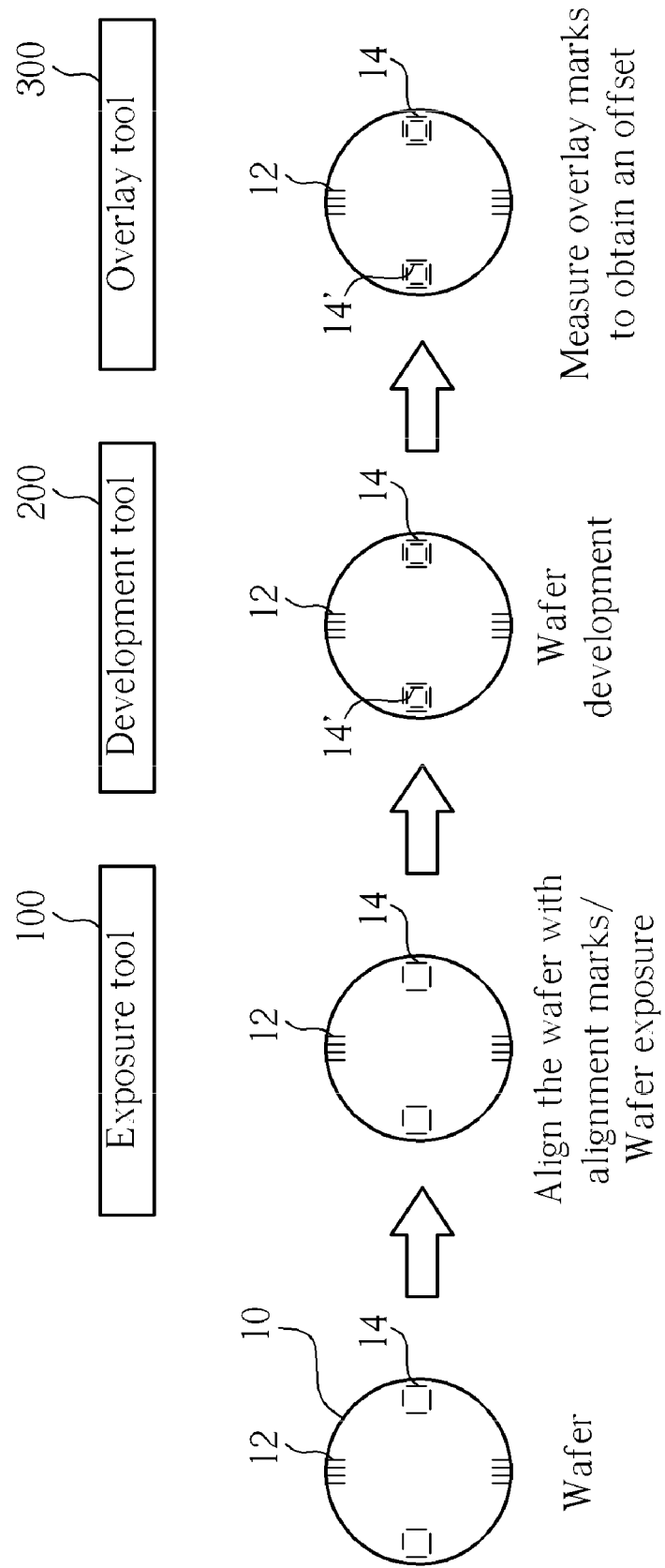
FIG. 1 shows a schematic diagram of wafer alignment according to the prior art.

FIG. 1 shows a schematic diagram of wafer alignment according to the prior art. As shown in FIG. 1, a wafer 10 such as a sample wafer is provided. The wafer 10 is covered by, respectively, a first material layer (not shown), a second material layer (not shown), and a third material layer (not shown). The first material layer and the second material layer can be a silicon layer, a conductive layer or an insulating layer. The third material layer can be a photoresist layer. At least an alignment mark 12 and at least an overlay mark 14 are disposed on the first material layer of the wafer 10. The alignment mark 12 and the overlay mark 14 can be sets of trenches located near an edge or in a scribe line of the wafer 10. Next, the wafer 10 is transferred to an exposure tool 100. Before exposure, the wafer 10 is aligned with a photo mask (not shown) in the exposure tool 100 by taking the alignment mark 12 as reference. Then a light source illuminates the wafer 10 through a photo mask, and a latent image of the circuit pattern is formed on the third material layer. After that, the wafer 10 is sent to a development tool 200. After development, part of the third material layer is removed, and the remaining third material layer forms an overlay mark 14' near the overlay mark 14. The overlay mark 14 and 14' may be a box-in-box mark, a bar-in-bar mark, or other suitable marks. Finally, the wafer 10 is sent to an overlay tool 300 to measure the distance between the overlay mark 14' and the overlay mark 14 to obtain an offset distance between the overlay mark 14' and the overlay mark 14. After the measurement, the offset distance is fed back to an operation system to adjust the exposure parameters and generate corrected exposure parameters. Then, the wafer in mass production can be aligned more precisely.

As mentioned above, the "pre-layer" described in the instant application refers to a material layer processed in a previous lithography step, and "current-layer" described in the instant application refers to a material layer which is to be processed in the current lithography process. Therefore, in the above example, the first material layer is pre-layer and the third material layer is current-layer. The alignment mark 12 in the first material layer is called a pre-layer alignment mark, and the overlay mark 14' made of the third material layer is called a current-layer overlay mark.

Figure 2:
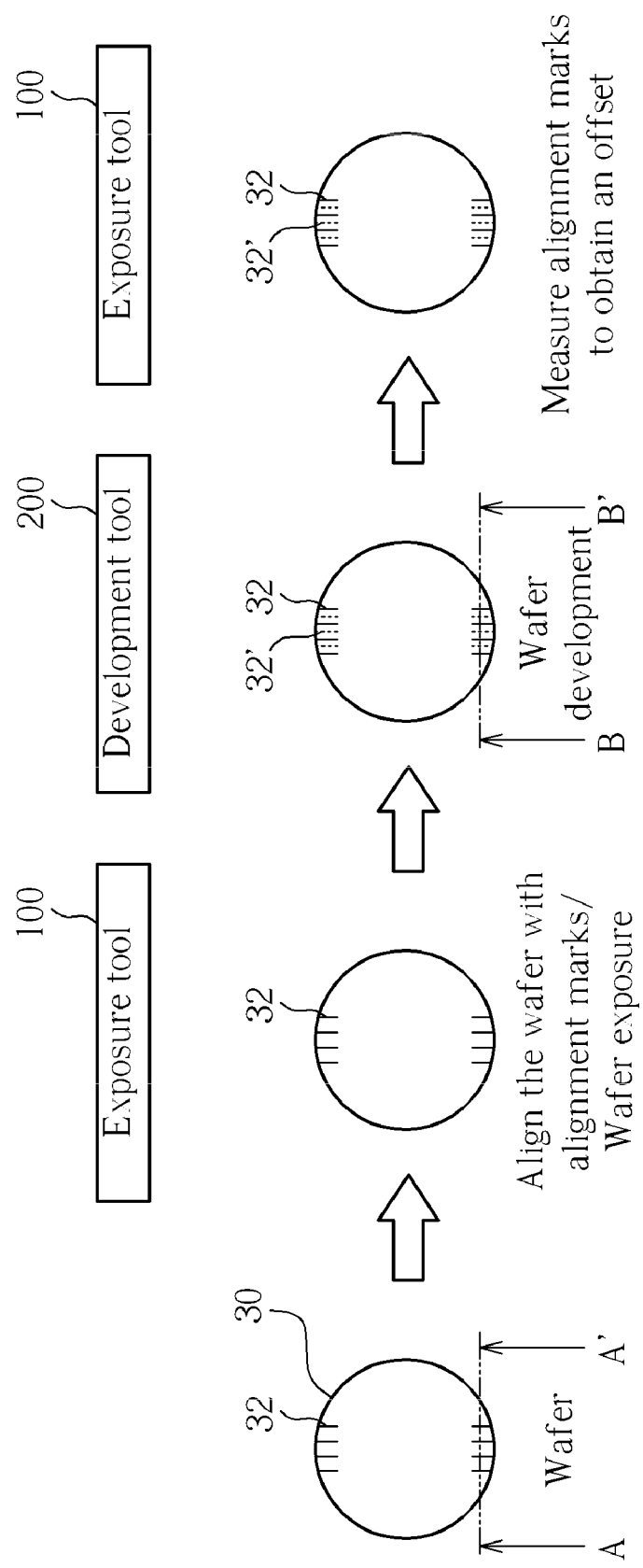
FIG. 2 shows a schematic diagram of wafer alignment according to a preferred embodiment of the present invention.

FIG. 2 shows a schematic diagram of wafer alignment according to a preferred embodiment of the present invention. Elements with the same function are designated with the same numerals in FIG. 1.

Figure 3:
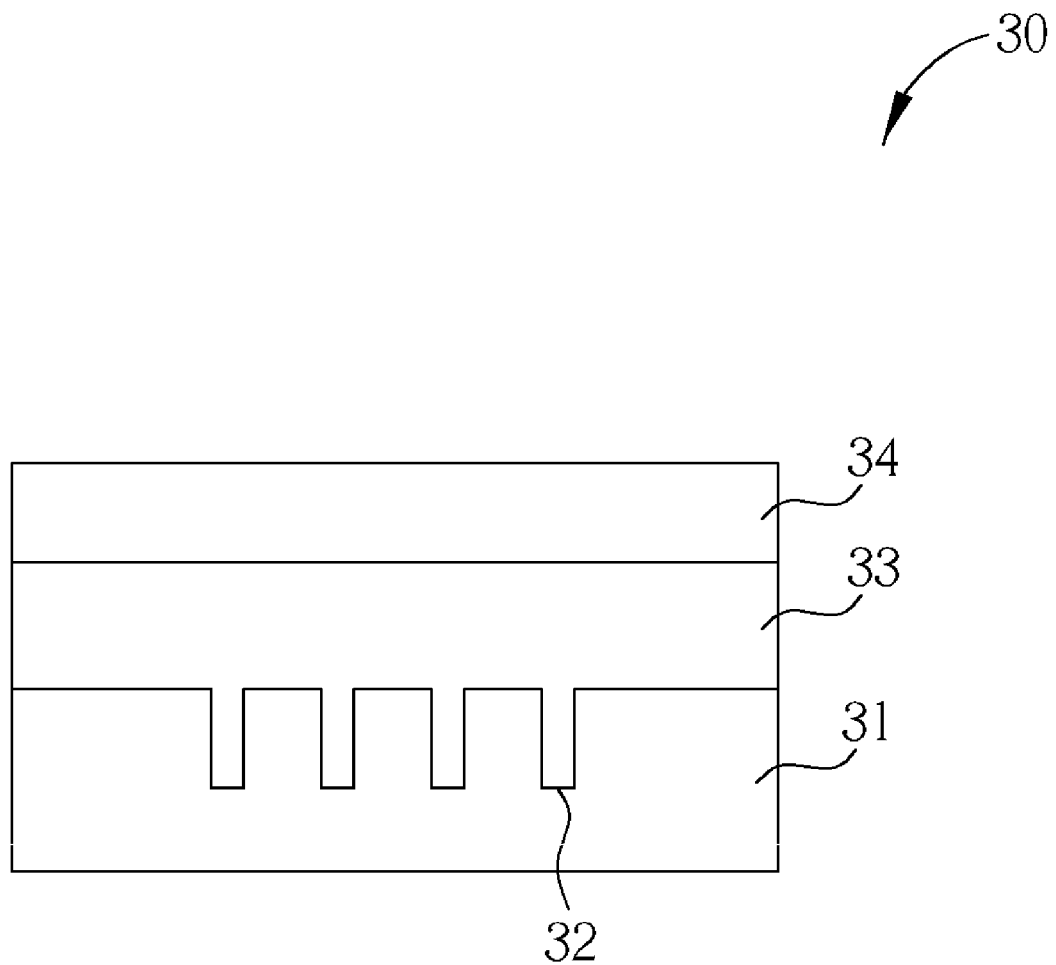
FIG. 3 is a cross sectional view along line A-A' of the wafer.

As shown in FIG. 2, a wafer 30 such as a sample wafer is provided. FIG. 3 is a cross sectional view along line A-A' of the wafer 30. As shown in FIG. 3, a material layer 31, a material layer 33 and a material layer 34 are disposed on the wafer 30 from bottom to top. The material layer 31 and the material layer 33 can be a silicon layer, a conductive layer or an insulating layer. The material layer 34 can be a photoresist layer. An alignment mark 32 is disposed on the material layer 31 of the wafer 30. The alignment mark 32 can be sets of trenches located near an edge or in a scribe line of the wafer 30. Next, the wafer 30 is transferred to an exposure tool 100 for exposure process. Before exposure, the wafer 30 is aligned with a photo mask (not shown) in the exposure tool 100 by taking the alignment mark 32 as reference: for example, adjusting the wafer stage to locate the wafer 30 to a suitable position in the exposure tool 100.

Figure 4:
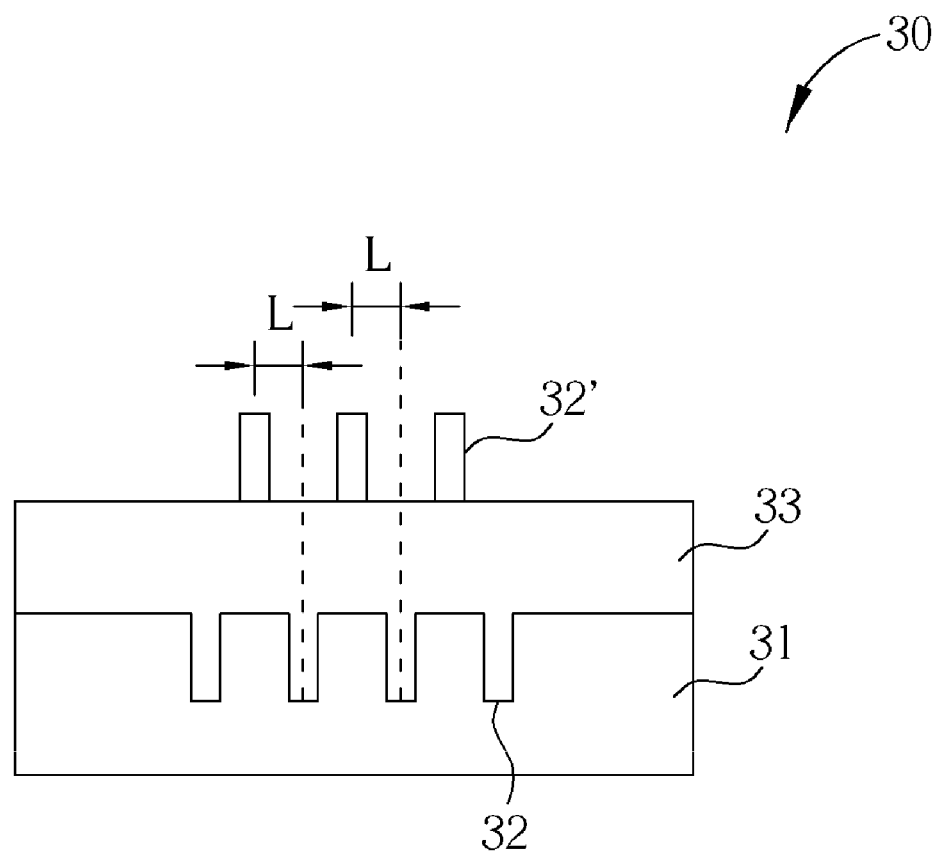
FIG. 4 is a cross sectional view along line B-B' of the wafer after its development, according to a preferred embodiment of the present invention.
Figure 5:
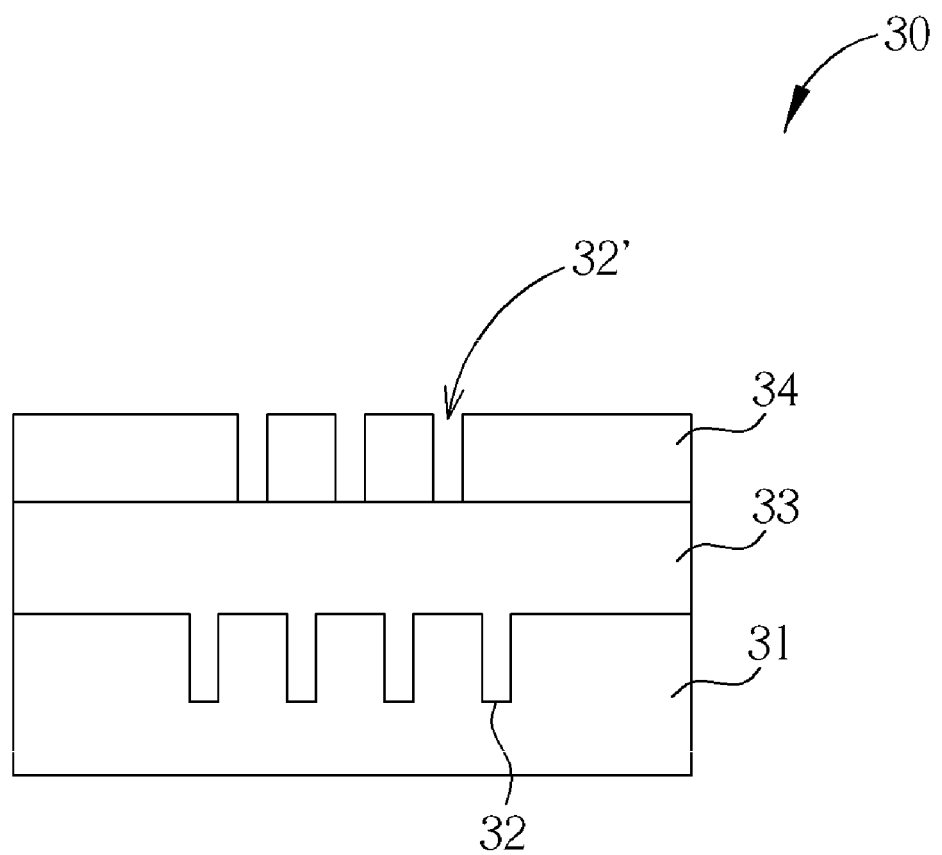
FIG. 5 is a cross sectional view along line B-B' of the wafer after its development, according to another preferred embodiment of the present invention.

Then a light source illuminates the wafer 30 through the photo mask, and a latent image of the circuit pattern is formed on the material layer 34. After that, the wafer 30 is sent to a development tool 200. FIG. 4 is a cross sectional view along line B-B' of the wafer 30 after its development, according to a preferred embodiment of the present invention. As shown in FIG. 2, FIG. 3 and FIG. 4, after development, part of the material layer 34 is removed, and the remaining material layer 34 forms an alignment mark 32' such as a protruding photoresist structure on the material layer 33 near the alignment mark 32. (support for claim 5) FIG. 5 is a cross sectional view along line B-B' of the wafer 30 after its development, according to another preferred embodiment of the present invention. As shown in FIG. 5, the alignment mark 32' can also be sets of recesses such as trenches in the material layer 34. Please refer to FIG. 2 and FIG. 4. The wafer 30 is sent to the exposure tool 100 again. By measuring the distance L between the alignment mark 32' and the alignment mark 32, an offset distance between the material layer 31 and material layer 34 can be obtained. Then, the offset distance can be fed back to the operation system to generate a corrected exposure parameters. If the offset distance is within tolerance, the etch process can be performed by taking the material layer 34 as a mask to etch the material layer 33, and the location of the alignment mark 32' can be transferred onto the material layer 33 to form another alignment mark for the following steps.

Compared to the prior art, the overlay mark is replaced by the alignment mark in the present invention, and the overlay tool is replaced by the exposure tool. The pre-layer alignment mark and the current-layer alignment mark are measured in the exposure tool to decide an offset distance between the previous layer and the current layer in the present invention. Since the measurement is performed utilizing the same exposure tool, the addition of deviations of the exposure tool and the overlay tool can be avoided. Moreover, according to the conventional method, the pattern of the alignment mark is already formed on the photo mask for aligning the wafer. In the preferred embodiment of the present invention, the alignment mark original formed on the photo mask is also used for measuring the offset distance of the previous layer and the current layer. Therefore, the overlay mark is no longer needed in the present invention. Furthermore, the conventional exposure tool is designed with a measurement function, therefore the hardware in the conventional lithography process can be applied to the present invention directly.

Those skilled in the art will readily observe that numerous modifications and alterations of the device and method may be made while retaining the teachings of the invention.

What is claimed is:

1. A method for wafer alignment, comprising:
   providing a wafer having thereon a first material layer and a second material layer on top of the first material layer, the first material layer provided with a first alignment mark;
   patterning the second material layer to form a second alignment mark by taking the first alignment mark as reference; and
   measuring an offset distance between the first alignment mark and the second alignment mark in an exposure tool, and adjusting an exposure parameter according to the offset distance.

2. The method for wafer alignment of claim 1, wherein the first material layer is selected from the group consisting of a silicon layer, a conductive layer and an insulating layer.

3. The method for wafer alignment of claim 2, wherein the second material layer is a photoresist layer.

4. The method for wafer alignment of claim 2, wherein the first alignment mark is a recess formed in the first material layer.

5. The method for wafer alignment of claim 4, wherein the second alignment mark is a protruding structure formed on the first material layer.

6. The method for wafer alignment of claim 4, wherein the second alignment mark is a recess formed in the second material layer.

7. The method for wafer alignment of claim 1, wherein the method of patterning the second material layer comprises;
   taking the first alignment mark as an alignment reference to align the wafer;
   exposing the second material layer; and
   developing the second material layer.

* * * * *